United States Patent
Thomas et al.

(10) Patent No.: US 10,827,089 B1
(45) Date of Patent: Nov. 3, 2020

(54) APPARATUS AND METHOD FOR CREATING CONSOLIDATED WORK FLOWS ON A MULTI-FUNCTION DEVICE

(71) Applicant: Xerox Corporation, Norwalk, CT (US)

(72) Inventors: Timothy David Thomas, Fairport, NY (US); Kim P. Ciulla, Bloomfield, NY (US); Janine M. Gates, Rochester, NY (US); Michael William Barrett, Fairport, NY (US); Steven Vincent Rosekrans, Rochester, NY (US); Sooraj Kumar, Webster, NY (US); Stephanie Jill Cruz, Ontario, NY (US); Connor Sterling Seiden, Webster, NY (US); Timothy Luke Dioguardi, Webster, NY (US); Paul Roberts Conlon, South Bristol, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 16/567,806

(22) Filed: Sep. 11, 2019

(51) Int. Cl.
| | |
|---|---|
| *G06F 3/12* | (2006.01) |
| *H04N 1/00* | (2006.01) |
| *G06F 9/451* | (2018.01) |
| *G06F 9/48* | (2006.01) |
| *G06F 11/34* | (2006.01) |
| *G06F 11/30* | (2006.01) |

(52) U.S. Cl.
CPC ......... *H04N 1/00949* (2013.01); *G06F 9/451* (2018.02); *G06F 9/4843* (2013.01); *G06F 11/3013* (2013.01); *G06F 11/3438* (2013.01); *H04N 1/00514* (2013.01); *H04N 1/00517* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,204,968 A | 4/1993 | Parthasarathi | |
| 8,533,290 B2* | 9/2013 | Shozaki | G06F 8/61 709/218 |
| 8,694,143 B2* | 4/2014 | Sawayanagi | G06F 3/1204 700/100 |
| 8,730,543 B2 | 5/2014 | Poysa et al. | |
| 8,842,319 B2 | 9/2014 | DeRoller | |
| 9,223,525 B2 | 12/2015 | Villone | |
| 9,864,553 B2* | 1/2018 | Kawaguchi | H04N 1/00477 |
| 9,912,824 B2 | 3/2018 | St. Jacques, Jr. | |

OTHER PUBLICATIONS

Ruvini et al., "Chapter Fourteen, Learning Users' Habits to Automate Repetitive Tasks," Your Wish is My Command: Programming by Example, Henry Lieberman, 2001.

* cited by examiner

*Primary Examiner* — Paul F Payer

(57) ABSTRACT

A method for creating a consolidated work-flow on a multi-function device (MFD) is disclosed. For example, the method is executed by a processor and includes monitoring user interactions with the MFD, determining that an interaction threshold is exceeded, creating the consolidated work-flow for a particular user interaction with the MFD, and creating a short-cut associated with the consolidated work-flow, wherein the short-cut is to be displayed on a user interface (UI) of the MFD, wherein the consolidated work-flow is executed when the short-cut is selected.

20 Claims, 6 Drawing Sheets

APPARATUS AND METHOD FOR CREATING CONSOLIDATED WORK FLOWS ON A MULTI-FUNCTION DEVICE

The present disclosure relates generally to multi-function devices (MFDs) and, more particularly, to MFDs that can automatically create consolidated work-flows on a multi-function device.

BACKGROUND

Multi-function devices (MFDs) can be used to perform a variety of different functions. For example, MFDs can be used to copy documents, print documents, fax documents, and the like. Each job function may include a variety of different job attributes or features. For example, within a particular job function, the attributes may include paper size, single-sided or two-sided, color, number of copies, finishing options (e.g., collate, staple, etc.), and the like.

The MFD may perform other functions for a job as well. For example, the MFD may email a document that is scanned or copied. The MFD may store the document, be used to modify the document, and the like. Thus, the MFD may provide many different functions that may improve the productivity of users.

SUMMARY

According to aspects illustrated herein, there are provided a method and an MFD for creating a consolidated work-flow. One disclosed feature of the embodiments is a method that monitors user interactions with the MFD, determines that an interaction threshold is exceeded by the user interactions, creates the consolidated work-flow for a particular user interaction with the MFD, and creates a short-cut associated with the consolidated work-flow, wherein the short-cut is to be displayed on a user interface (UI) of the MFD, wherein the consolidated work-flow is executed when the short-cut is selected.

Another disclosed feature of the embodiments is an MFD for creating a consolidated work-flow. The MFD comprises a graphical user interface (GUI), a memory to store user interactions with the GUI and an interaction threshold, and a processor in communication with the GUI and the memory. The processor is to monitor user interactions with the GUI, determine that the interaction threshold is exceeded by the user interactions, create the consolidated work-flow for a particular user interaction with the GUI, and create a short-cut associated with the consolidated work-flow, wherein the short-cut is to be displayed on the GUI, wherein the consolidated work-flow is executed when the short-cut is selected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for automatically creating consolidated work-flows on a multi-function device. As discussed above, MFDs can be used to perform various different job functions. Each job function may have different attributes and features.

In some examples, a user may repetitively use the same attribute selections for different job functions. The user may perform many "clicks" or selections on the user interface (UI) of the MFD to enter all of the attribute selections. This may be a time consuming process.

In other examples, a particular job function may be complicated. Thus, finding the appropriate selections in a series of menus on the UI of the MFD may be difficult, or knowing the correct feature selections for a particular job may be difficult.

The present disclosure may monitor user interaction with the MFD and, based on the interaction, a consolidated work-flow may be automatically created on the MFD. The user interaction may include a number of clicks (e.g., touch selection on a touch screen, a selection with a pointer or mouse, a verbal selection, a gesture selection, and the like), a complexity of a job selection, a repetition of the same selection of features for a particular job at a particular time of day, and the like.

In one embodiment, the consolidated work-flow may appear as an icon on the UI of the MFD. The icon may appear for a particular user or a particular department. In one embodiment, the icon may temporarily appear (e.g., during a time of day when the job function is typically performed on the MFD) and be removed at other times to avoid cluttering the UI with too many icons.

In one embodiment, the user interaction may be monitored at a plurality of different MFDs at different locations by a remotely located server (e.g., in the "cloud", "on-premise" servers, and the like). When a consolidated work-flow is generated for a particular job for a particular user, the icon to execute the consolidated work-flow may be transmitted to an MFD used by the user by the remotely located server. Thus, the consolidated work-flows may be more accurately generated based on user interactions, or aggregate user interactions of a particular group of users, across different devices and follow the user to any MFD that is communicatively coupled to the remotely located server.

Figure 1:
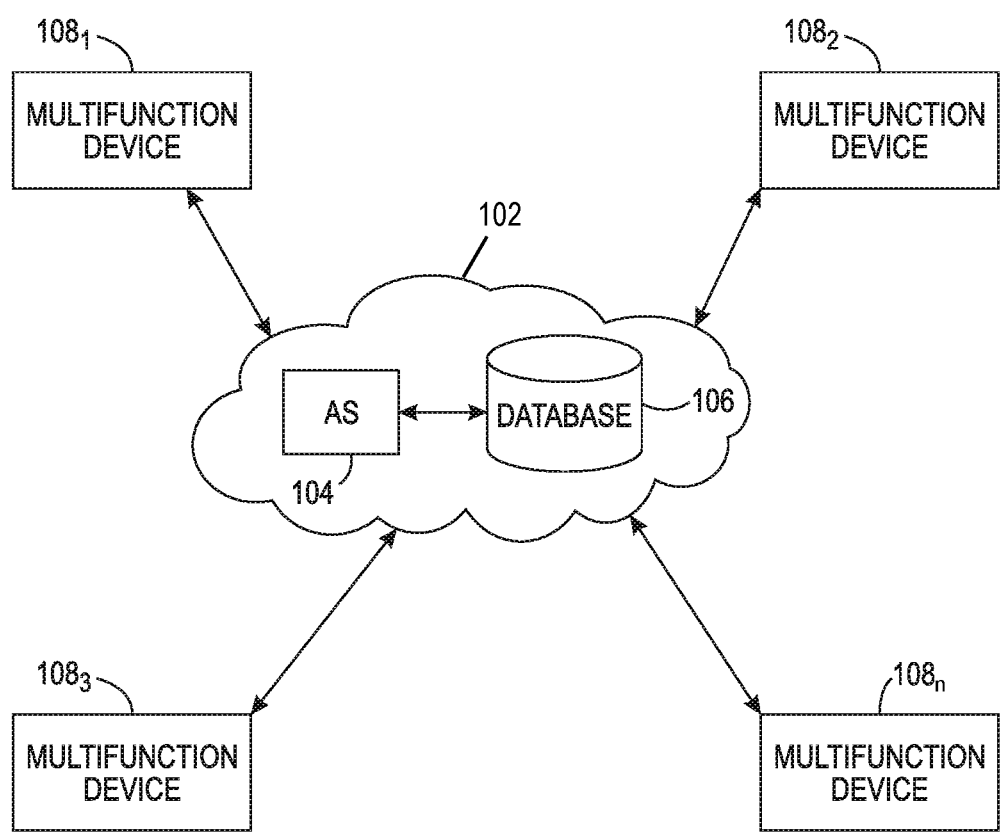
FIG. 1 illustrates a block diagram of a system of the present disclosure.

FIG. 1 illustrates an example system 100 of the present disclosure. In one embodiment, the system 100 may include a communication network 102 that includes an application server (AS) 104 and a database (DB) 106. The communication network 102 may be an Internet protocol (IP) network. The communication network 102 may be wide area network (e.g., across different geographic locations) or a local area network (e.g., a wireless network within a building).

It should be noted that the communication network 102 has been simplified for ease of explanation. The communication network 102 may include other devices or components that are not shown. For example, the communication network 102 may include routers, switches, gateways, firewalls, and the like.

The AS 104 may be a computing device that includes a processor and memory. The AS 104 may be communicatively coupled to the DB 106. The DB 106 may include a computer readable storage medium that may store various information or data. For example, DB 106 may store user profiles, user log-in credentials, and the like. When the consolidated work-flows are created remotely by the AS 104 (as discussed below), the DB 106 may also store monitored user interactions, interaction thresholds, and the like.

In one embodiment, the AS 104 may be communicatively coupled to one or more multi-function devices (MFDs) $108_1$-$108_n$ (hereinafter also referred to individually as an MFD 108 or collectively as MFDs 108). The MFDs 108 may be located across different geographic locations or may be located across different locations within the same building (e.g., in different rooms, on different floors, within different departments, and the like). In one embodiment, data may be transmitted between the MFDs 108 and the AS 104 to perform the functions described herein. In some embodiments, the consolidated work-flows may be created locally by the MFD 108.

In other embodiments, the consolidated work-flows may be created remotely by the AS 104 and transmitted to any one of the MFDs 108. For example, a user may be logged into the MFD $108_2$ and the AS 104 may transmit the created consolidated work-flow to the MFD $108_2$, as discussed in further details below.

In one embodiment, the MFDs 108 may perform various job functions. For example, the MFDs 108 may print, copy, fax, scan, email documents, and the like. The MFDs 108 may provide a variety of different attributes or features with each job function. For example, the MFDs 108 may allow a user to select color, size, plex (e.g., single sided or double sided), resolution, finishing (e.g., collate, staple, hole punch, and the like), specify email recipients, and the like. When the consolidated work-flows are created locally by the MFD 108, the MFD 108 may also be modified to include functionality to monitor user interactions and to create the consolidated work-flows.

Figure 2:
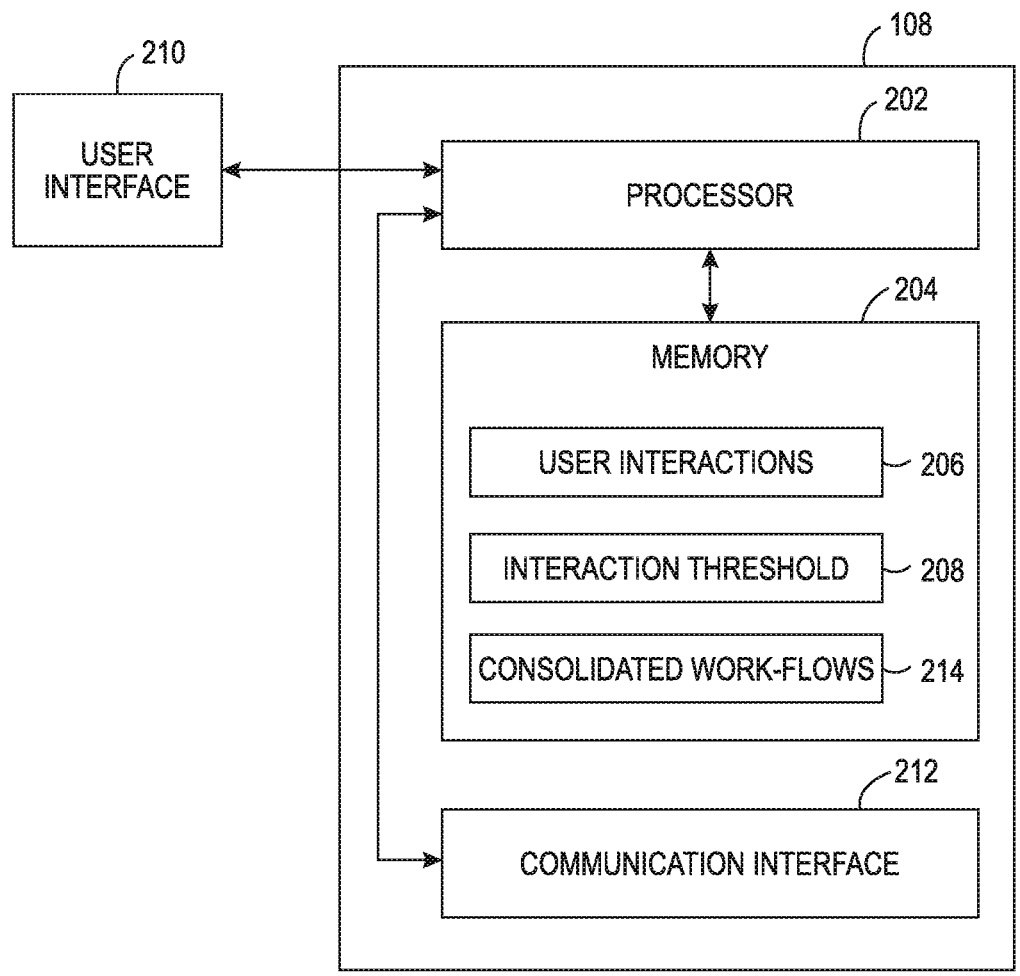
FIG. 2 illustrates a block diagram of an MFD that automatically creates consolidated work-flows of the present disclosure.

FIG. 2 illustrates an example of the MFD 108 that is modified to perform the functions of the present disclosure. In one embodiment, the MFD 108 may include a processor 202, a memory 204, a user interface (UI) 210, and a communication interface 212. The processor 202 may be communicatively coupled to the memory 204, the UI 210, and the communication interface 212. The processor 202 may execute instructions stored in the memory 204 to perform the functions described herein (e.g., creating the consolidated work-flows).

In one embodiment, the UI 210 may be a graphical user interface (GUI). The UI 210 may include a display and input buttons. In one embodiment, the UI 210 may include a touch screen display and users may directly touch icons or menu options by touching the display.

In one embodiment, the communication interface 212 may be a wired or wireless communication interface 212. For example, the communication interface 212 may be an Ethernet port, a wireless radio, a router, an adapter, and the like. The communication interface 212 may establish a communication path to the AS 104 via the network 102.

In one embodiment, the memory 204 may be a non-transitory computer readable medium. The memory 204 may be a random access memory (RAM), a read only memory (ROM), a hard disk drive, a solid state drive, or any combination thereof.

In one embodiment, the memory 204 may include user interactions 206, an interaction threshold 208, and consolidated work-flows 214. In one example, the user interactions 206 may be monitored user interactions of a user or different users on an MFD 108 that can be stored. For example, each time a user interacts with one of the MFDs 108, the interaction with the MFD 108 is stored in the user interactions 206.

In one embodiment, the user interactions 206 may include storing interaction summaries, counts, and/or tallies of a particular interaction. In other words, the entire user interaction (e.g., a recording of each selection made during an interaction) may not be stored to reduce memory usage, reduce processing, consolidate data, and the like.

In one embodiment, the user interactions 206 may store the entire user interaction. For example, the user interaction 206 may store each selection that was made while the user interacts with the MFD 108.

In an example of a user interaction, a first user may log into the MFD $108_1$. The user may make 100 copies of a document on 8.5×11 inch paper. The user may select a finishing option of stapling. Such a user interaction may be stored for the first user in the user interactions 206. A second user may log into the MFD $108_1$ and scan a document and enter three recipients to receive the scanned document. Such a user interaction may be store for the second user in the user interactions 206.

In one embodiment, the interaction threshold 208 may include a threshold for various interactions. When the interaction threshold 208 is exceeded, the job may be considered to be complex or repetitive and benefit from a consolidated work-flow.

The interaction threshold 208 may be monitored for a single user or an aggregate group of users. For example, interactions of employees in a particular department, a common job function, a common job code, and the like, may be tracked for the interaction threshold 208. Thus, a consolidated work-flow 214 may be created for a single user or an aggregate group of users.

In one embodiment, the interaction threshold 208 may be a repetition threshold. For example, the repetition threshold may determine if the same job function and attributes are selected by a user more than a predefined number of times (e.g., 5 times, 10 times, 50 times, and the like). In one embodiment, the repetitions may be tracked within a time window. The time window may be a periodic time window or a continuously rolling time window. For example, the repetition may be tracked over a 24 hour period, a week, a month, and the like.

In one embodiment, the interaction threshold 208 may be a threshold for a number of clicks or selections. A "click" or "selection" may be defined herein to include touching a portion of a touch screen display, using a external mouse or touch pad to control a pointer on a display, a selection made with gestures (e.g., finger movements, hand movements, and the like), a verbal selection, and the like. In an example, if the number of clicks exceeds a predefined number of clicks (e.g., 10 clicks, 15 clicks, 20 clicks, and the like), the processor 202 may determine that the job is complicated. For example, a user may select a job function that requires multiple selections in the UI 210 and then select various attributes that also cause a number of clicks.

In one embodiment, the interaction threshold 208 may be a time threshold. For example, the time threshold may determine if a user interaction exceeds an expected duration threshold. For example, the expected duration threshold may be 20 seconds, 30 seconds, 1 minute, and the like. If the expected duration threshold is exceeded, then the job may be complicated.

To illustrate, a user may spend a few minutes navigating through several menus on the UI 210 and making various selections for a particular work-flow. The amount of time the user takes to make the selections may exceed the expected duration threshold. In one embodiment, different work flows may have different expected duration thresholds. For example, a work flow associated with making a copy may have an expected duration threshold of 30 seconds, a work flow associated with scanning and emailing a document may have an expected duration threshold of 2 minutes, and the like.

In one embodiment, the interaction threshold 208 may be a weight value. For example, each job function and each attribute on the MFD 108 may be assigned a weight value. The total weight value of a job and the user selected attributes may be added together. If the total weight value exceeds the weight value threshold, then the job may be considered to be complicated. For example, more complicated jobs or attribute selections may have a higher weight value, and less complicated jobs and attribute selections may have a lower weight value.

To illustrate, the weight value threshold may be 1.0. A scan function may have a weight value of 0.2, a resolution attribute may have a weight value of 0.2, a changing the size may have a weight value of 0.1, and emailing the document may have a weight value of 0.6. If a user scans a document and changes the resolution and size, the total weight value may be 0.5. Thus, the total weight value may be less than the threshold of 1.0. However, another user may scan the document, change the resolution, change the size and email the document. Thus, the total weight value may be 1.1, may exceed the threshold of 1.0, and may be deemed a complicated work-flow. In response, a consolidated work-flow may be automatically created.

It should be noted that the weight values used above are provided as examples. Each job and attribute may be assigned any weight value that is appropriate for a desired application and associated threshold.

Thus, when the interaction threshold 208 is exceeded, the processor 202 may determine that the job is complex or repetitive and automatically create a consolidated work-flow 214. In one embodiment, the processor 202 may provide a notification or message on the UI 210 asking the user if the user would like to create a consolidated work-flow. If the user confirms the option, the processor 202 may create the consolidated work-flow 214.

In one embodiment, the consolidated work-flow 214 may include a series of executable instructions that are performed by the MFD 108. The executable instructions may be executed by the processor 202 to automatically enter all of the selections to be executed. Thus, the user does not have to manually make each selection of a job function through a series of menus and sub-menus and select each attribute via various selections and drop down windows.

The consolidated work-flow 214 may also be associated with a short-cut. In one embodiment, the short-cut may be an icon, text, a verbal representation (e.g., using a voice command to call the short-cut), a gesture representation (e.g., using a camera on the MFD to capture and interpret a gesture by the user), and the like.

In one embodiment, when the short-cut is shown on the GUI 210, the short-cut may provide information that can help identify the consolidated work-flow 214 associated with the short-cut. For example, the short-cut may be an icon, as noted above. The icon may include an image that may indicate the job function and associated attributes. Thus, if a user makes multiple consolidated work-flows 214, the user may be able to differentiate which consolidated work-flow 214 are represented by which icon.

In one embodiment, the icon may be displayed on the UI 210 for the user after the consolidated work-flow 214 is created. Thus, when a user subsequently logs into an MFD 108, the icon may appear in the UI 210 and the user may touch or select the icon. When the icon is selected, the consolidated work-flow 214 associated with the icon may be automatically executed.

In one embodiment, the interaction threshold 208 may be associated with a particular date and/or time. For example, the first user may perform a particular job function and select the same attributes every Friday at 4 PM. For example, the user may work in payroll and make copies of payroll documents on the payroll MFD 108 every Friday at 4 PM. In another example, a second user may perform a particular job function and select the same attributes every last Friday of the month at 2 PM. For example, the user may work in accounting and make copies of monthly invoices on the last Friday of every month at the same time.

When the interaction threshold 208 is associated with a particular date and/or time, the consolidated work-flow 214 created in response to the interaction threshold 208 that was exceeded may also be associated with the particular date and/or time. Thus, the icon created for the consolidated work-flow 214 may only appear on the UI 210 during the particular date and/or time.

Using the example above, when the first user that works in payroll arrives to the MFD 108 on Friday at 4 PM, the icon associated with consolidated work-flow 214 for the user may appear in the UI 210. However, when the user arrives at the MFD 108 at any other time, the icon may not appear in the UI 210.

In one embodiment, the time period may be a time window. For example, the icon may appear on Friday between 3:55 PM and 4:15 PM. In one example, the time window may be determined based on the times the user executed a particular job associated with the consolidated work-flow 214 while the user interactions 206 were being monitored and collected for analysis.

As noted above, in some instances, the AS 104 may perform the creation of consolidated work-flows. When the AS 104 creates the consolidated work-flows, the DB 106 may store the user interactions 206, the interaction threshold 208, and the consolidated work-flows 214.

The user interactions of each user on each MFD 108 may be transmitted to the AS 104 via the communication interfaces 212 of the MFDs 108. Thus, the consolidated work-flows 214 may be created by the AS 104 based on user interactions 206 that are collected over different MFDs 108 at different locations for the same user.

In one embodiment, the different consolidated work-flows 214 may be created for the same user depending on which MFD 108 the user is using. For example, the user may perform a particular repetitive job on the MFD $108_1$, the user may perform a complex job on the MFD $108_2$ and so forth. The consolidated work-flows 214 may be created for these jobs for the user. As a result, when the AS 104 detects that the user has logged into the MFD $108_1$, the icon and associated consolidated work-flow 214 may be transmitted to the MFD $108_1$. When the user logs into the MFD $108_2$, the icon and associated consolidated work-flow 214 may be transmitted to the MFD 108$_2$, and so forth.

In some examples, the user may attempt to manually create a consolidated work-flow 214 on the MFD 108. The processor 202 may track the manual creation and detect whether the consolidated work-flow 214 already exists. Thus, the MFD 108 may notify the user, via the UI 210, that the consolidated work-flow 214 already exists and prevent the user from creating a duplicate copy of the consolidated work-flow 214.

Figure 3A:
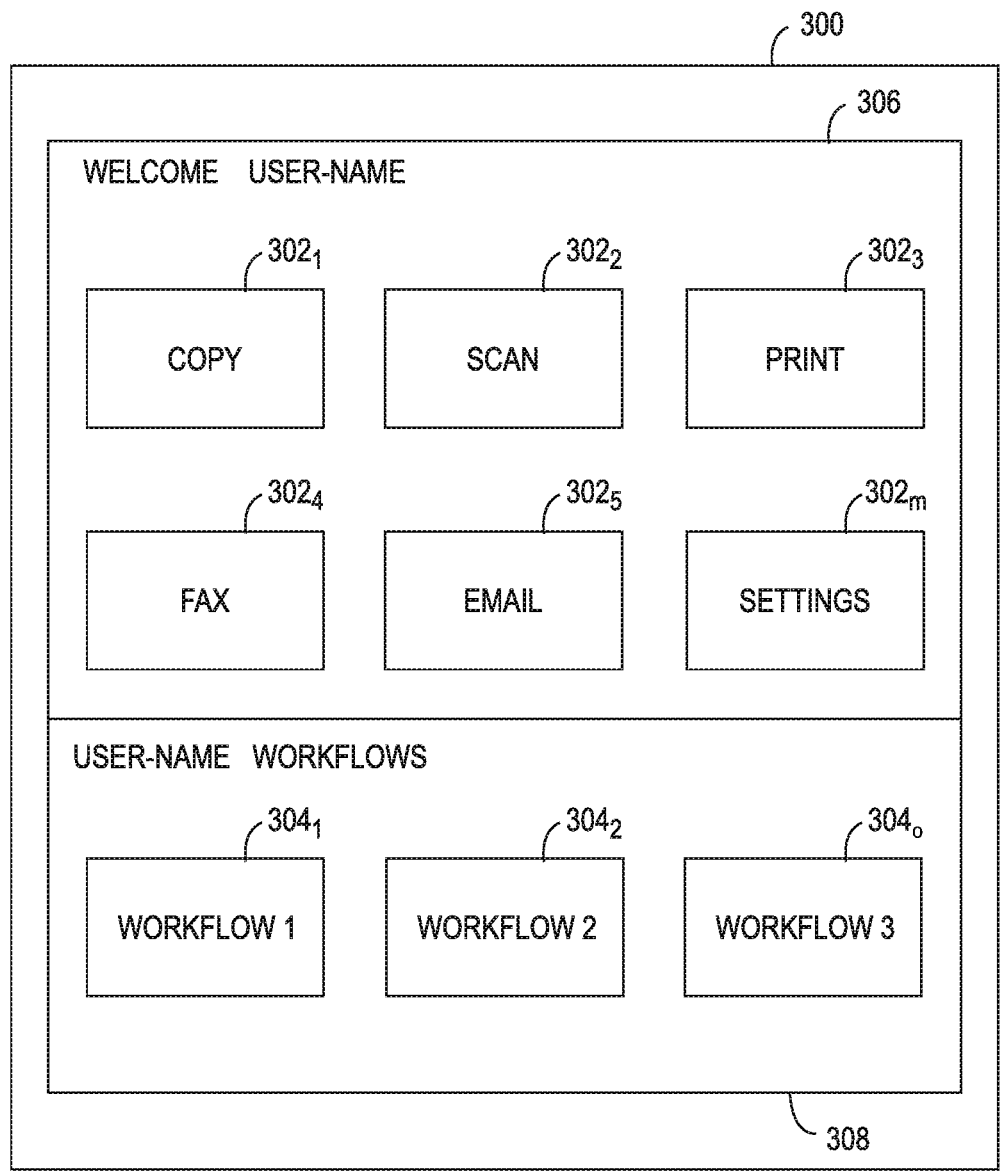
FIGS. 3A-3B illustrate example screenshots of a user interface of the MFD with an icon for the consolidated work-flow of the present disclosure.
Figure 3B:
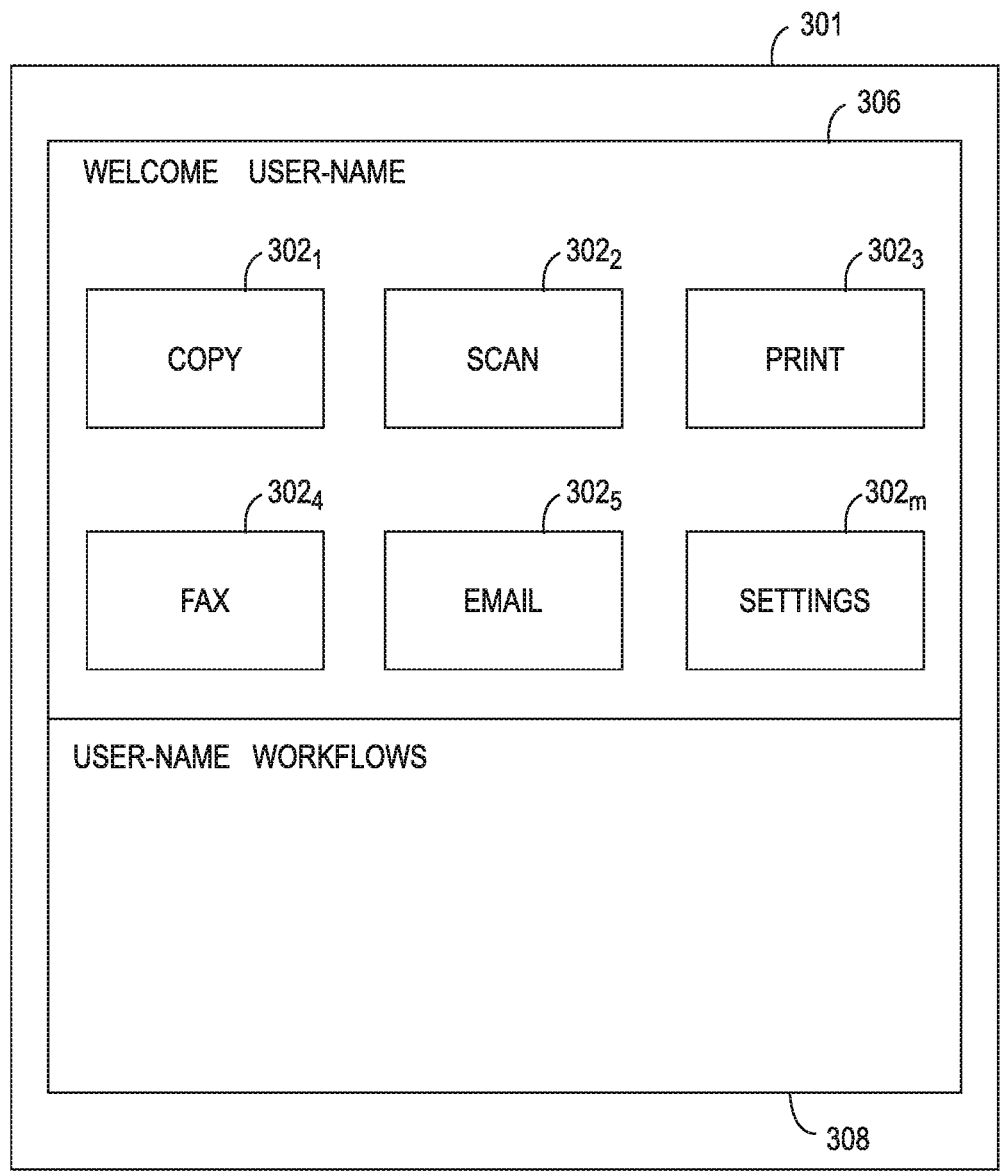

FIGS. 3A-3B illustrate example screenshots 300 and 301 of the UI 210 of the MFD 108. In one embodiment, the user may interact with the MFD 108 and the consolidated work-flows may be automatically created, as discussed above.

In one embodiment, a first portion 306 of the UI 210 may display icons 302$_1$-302$_m$ (hereinafter also referred to individually as an icon 302 or collectively as icons 302). The icons 302 may be the default icons that are pre-programmed into the UI 210 to perform various job functions and allow the user to select various attributes. For example, the icons 302 may include an icon for job functions such as copy, scan, print, fax, email, settings, and the like. It should be noted that a few job functions are provided as examples, but any number of icons of other job functions may also be included.

In one embodiment, a second portion 308 of the UI 210 may include icons 304$_1$-304$_o$ (hereinafter also referred to individually as an icon 304 or collectively as icons 304). The icons 304 may be in the second portion 308 to allow the user to quickly and easily identify the automatically created consolidated work-flows based on previous interactions, as described above. In one embodiment, the icons 304 may be mixed together with the icons 302 in the same portion of the UI 210.

In one embodiment, the icons 304 may be generated and displayed in the UI 210. The icon 304 may include an image that provides information to the user regarding which consolidated work-flow is associated with the icon 304. In one embodiment, the user may provide a custom name with each icon 304 when the icon 304 is created. In one embodiment, when the icon 304 is selected, a pop-up window may provide a brief description of the consolidated work-flow that is associated with the icon 304.

In one embodiment, the UI 210 may provide a search tool to search for the consolidated work-flow 214. For example, if the short-cut is represented as a verbal command or a gesture rather than an icon, the consolidated work-flow 214 may not be shown in the UI 210. Thus, a user may search for the consolidated work-flow 214 using a keyword search to find the voice command or gesture associated with the consolidated work-flow 214.

The icons 304 may automatically be formatted in accordance with the formatting of the UI 210. For example, different MFDs 108 may have different color schemes, fonts, font sizes, arrangement of icons 302, and so forth. The icons 304 may be created to match the format of the UI 210.

Each icon 304 may be associated with a consolidated work-flow that was automatically created. Thus, when a user selects an icon 304, the consolidated work-flow associated with the icon 304 may be automatically executed. In other words, the user may provide a single click (e.g., the selection of an icon 304) and the MFD 108 may automatically perform the multiple selections associated with the consolidated work-flow.

In one embodiment, different icons 304 may be displayed for different users. For example, different users may have different consolidated work-flows that are automatically created. Thus, the type of icons 304 and the number of icons 304 that are displayed in the UI 210 may be a function of which user is logged into the MFD 108.

The screenshot 300 may be shown when a user logs into the MFD 108 at a time or date associated with certain consolidated work-flows. Thus, when the user approaches at the appropriate data and/or time, the icons 304 may be displayed on the UI 210.

However, when the user logs into the MFD 108 outside of a date and/or time associated with the consolidated work-flows, the icons 304 may be removed, as shown in the screenshot 301. In one embodiment, removing the icons 304 may include hiding the icons 304, greying out the icons 304, disabling the ability to select the icons 304, and the like. Thus, the MFD 108 may dynamically display and/or remove icons 304 associated with the consolidated work-flows based on a particular date and/or time.

In one embodiment, the icons 304 may also be dynamically displayed and removed based on a location of the MFD 108. For example, some consolidated work-flows may be associated with a particular department. Thus, when a user logs into an MFD 108 located in the particular department, the icons 304 may be shown as shown in the screenshot 300. However, if the user logs into the MFD 108 located outside of the particular department the icons 304 may be removed as shown in the screenshot 301.

In one embodiment, the icons 304 can also be shown based on other factors. For example, the icons 304 that are shown may be based on the capability of the MFD 108. For example, the consolidated work-flow 214 may use color images, but the MFD 108 that the user is logged into may not have color printing capability. As a result, an icon 304 associated with that consolidated work-flow 214 may not be shown.

In one embodiment, the AS 104 may be in communication with the MFDs 108 and perform the creation of the consolidated work-flows and the icons 304. When the AS 104 performs the functions described herein, the AS 104 may detect which MFD 108 a user is logged into. The AS 104 may then transmit the icons 304 associated with the user and/or a particular date or time, a particular location, and the like, to the MFD 108.

When the user logs off of the MFD 108, the AS 104 may instruct the MFD 108 to remove the icons 304. The process may be repeated when a different user logs into the MFD 108.

Figure 4:
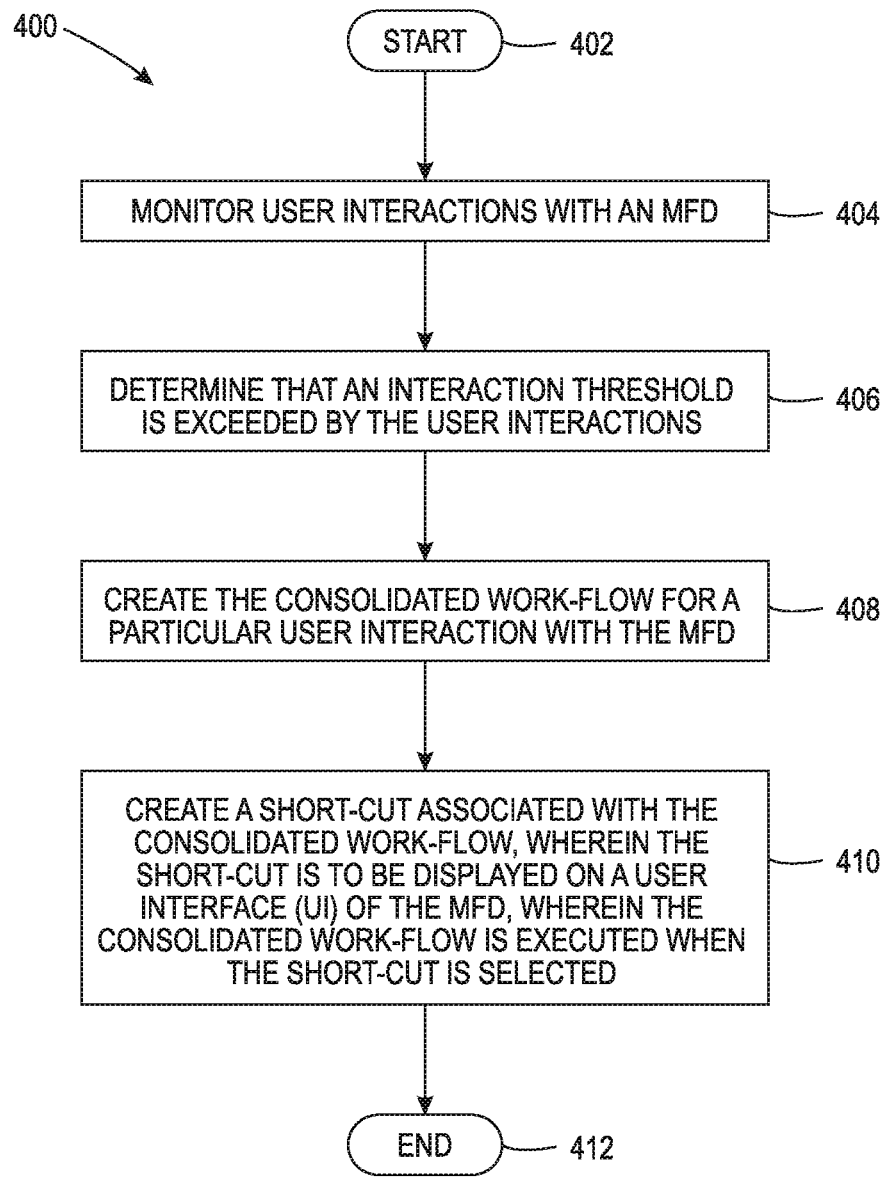
FIG. 4 illustrates a flowchart of an example method for creating a creating a consolidated work-flow on an MFD of the present disclosure.
Figure 5:
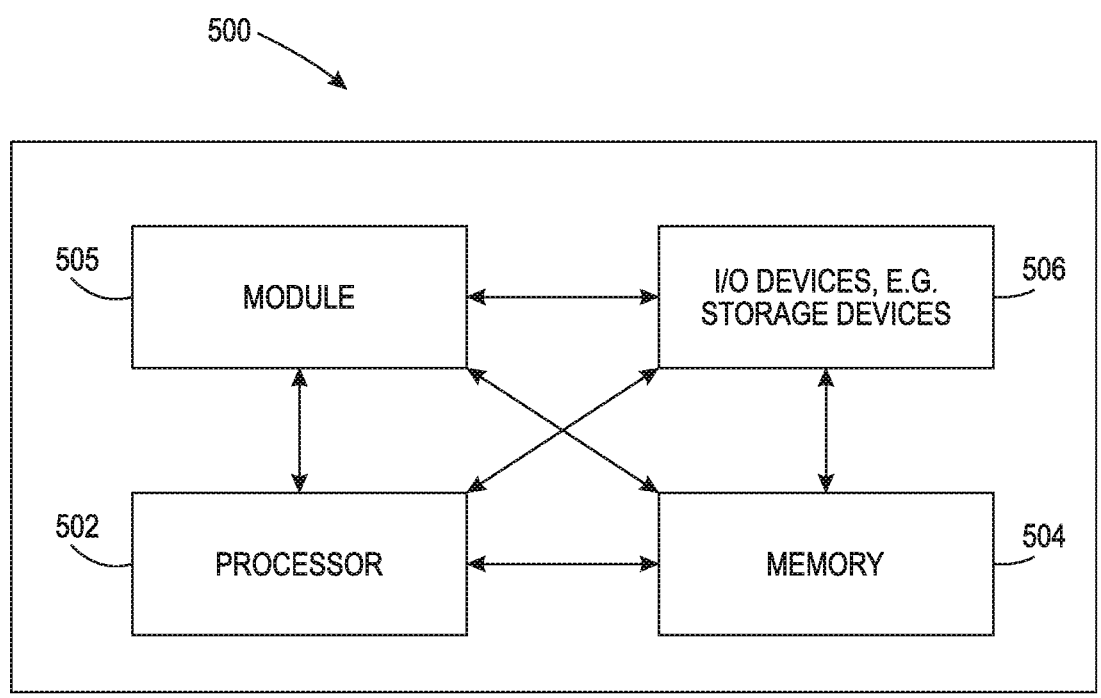
FIG. 5 illustrates a high-level block diagram of an example computer suitable for use in performing the functions described herein.

FIG. 4 illustrates a flowchart of an example method 400 for creating a consolidated work-flow on an MFD of the present disclosure. In one embodiment, one or more blocks of the method 400 may be performed by the AS 104, the MFD 108, or a computer/processor that controls operation of an MFD as illustrated in FIG. 5 and discussed below.

At block 402, the method 400 begins. At block 404, the method 400 monitors user interactions with the MFD. For example, the MFD or a remotely located AS may monitor which job functions are selected, the attributes that are selected for a particular job function, and the like. The interactions may be monitored over a period of time (e.g., several hours, a day, a week, and the like).

In one embodiment, the interactions may be stored as they are tracked for multiple users. In one embodiment, the method 400 may also track the date and time the interactions occur, the number of clicks associated with each interaction, calculate a scoring weight for each interaction, and the like.

At block 406, the method 400 determines that an interaction threshold is exceeded by the user interactions. In one embodiment, the interaction threshold may be a value based on the type of interaction threshold. When the interaction threshold is exceeded, this may indicate that the user may benefit from a consolidated work-flow.

In one embodiment, the interaction threshold may be a repetition threshold. For example, the interaction threshold may be 5, 10, or 20, or any other desired value. The repetition threshold may track whether a particular job function and attributes are repeated a predefined number of times. In one embodiment, the repetition threshold may also include a time window or a rolling time window (e.g., performing the same job function and attributes 10 times within a 24 hour period).

In one embodiment, the interaction threshold may be a number of clicks. For example, a job function and selection of various attributes or features may take 30 different clicks. Thus, the user may benefit from a consolidated work-flow that executes all 30 clicks automatically with a single click that selects an associated icon in the UI of the MFD.

In one embodiment, the interaction threshold may be a period of time. For example, a particular job function and selection of attributes may take longer than a predefined period of time (e.g., greater than 30 seconds, 1 minute, and the like). The user may take a long time because the job function is complicated, the various attributes may be difficult to find when navigating through a menu on the UI, or may simply have a large number of clicks.

In one embodiment, the interaction threshold may be a weight value. For example, each job function and each attribute on the MFD may be assigned a weight value. The total weight value of a job and the user selected attributes may be added together. If the total weight value exceeds the weight value threshold, then the job may be considered to be complicated. For example, more complicated jobs or attribute selections may have a higher weight value, and less complicated jobs and attribute selections may have a lower weight value.

At block 408, the method 400 creates the consolidated work-flow for a particular user interaction with the MFD. In one embodiment, the consolidated work-flow may include a series of executable instructions that are performed by the MFD. The executable instructions may be executed by the MFD to automatically enter all of the selections to be executed. Thus, the user does not have to manually make each selection of a job function through a series of menus and sub-menus and select each attribute via various selections and drop down windows.

At block 410, the method 400 creates a short-cut associated with the consolidated work-flow, wherein the short-cut is to be displayed on a user interface (UI) of the MFD, wherein the consolidated work-flow is executed when the short-cut is selected. The short-cut may include an icon, text, a verbal command, a gesture command, and the like.

In one embodiment, when the short-cut is an icon, the icon may include an image that may indicate the job function and associated attributes. Thus, if a user makes multiple consolidated work-flows, the user may be able to differentiate which consolidated work-flows are represented by which icon.

In one embodiment, the icon may be displayed on the UI for the user after the consolidated work-flow is created. Thus, when a user subsequently logs into an MFD, the icon may appear in the UI and the user may touch or select the icon. When the icon is selected, the consolidated work-flow associated with the icon may be automatically executed.

In one embodiment, the icons may appear during certain time windows associated with the consolidated work-flow. For example, if the consolidated work-flow is performed every Friday between 4 PM and 5 PM, the icon may appear on the MFD when the user logs into the MFD on a Friday between 4 PM and 5 PM.

In one embodiment, the icons may appear on certain MFDs in certain locations. For example, if a consolidated work flow is performed by an employee in payroll, the icon may appear in the MFD located in the payroll department. At block 412, the method 400 ends.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for creating a consolidated work-flow on an MFD, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for creating a consolidated work-flow on an MFD (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for creating a consolidated work-flow on an MFD (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for creating a consolidated work-flow on a multi-function device (MFD), comprising:
monitoring, by a processor, user interactions with the MFD;
determining, by the processor, that an interaction threshold is exceeded by the user interactions;
creating, by the processor, the consolidated work-flow for a particular user interaction with the MFD; and
creating, by the processor, a short-cut associated with the consolidated work-flow, wherein the short-cut is to be displayed on a user interface (UI) of the MFD, wherein the consolidated work-flow is executed when the short-cut is selected.

2. The method of claim 1, wherein the monitoring comprises monitoring the user interactions across a plurality of different MFDs.

3. The method of claim 1, wherein the user interaction comprises a selection of a job function and a selection of one or more features associated with the job function.

4. The method of claim 1, wherein the interaction threshold comprises a number of selections.

5. The method of claim 1, wherein the interaction threshold comprises a complexity weighting score.

6. The method of claim 1, wherein the interaction threshold comprises an expected duration threshold for a work-flow on the MFD.

7. The method of claim 1, wherein the interaction threshold is associated with a time window.

8. The method of claim 7, further comprising:
displaying, by the processor, the short-cut on the UI of the MFD at the particular date and time associated with the interaction threshold; and
removing, by the processor, the short-cut from the UI of the MFD outside of the particular date and time associated with the interaction threshold.

9. The method of claim 1, wherein the short-cut and the consolidated work-flow are associated with a user.

10. The method of claim 9, further comprising:
detecting, by the processor, that the user is logged into a remotely located MFD; and
transmitting, by the processor, the short-cut to be displayed on the remotely located MFD to execute the consolidated work-flow associated with the short-cut.

11. A multi-function device (MFD) to create a consolidated work-flow, comprising:
a graphical user interface (GUI);
a memory to store user interactions with the GUI and an interaction threshold; and
a processor in communication with the GUI and the memory, wherein the processor is to:
monitor the user interactions with the GUI;
determine that the interaction threshold is exceeded by the user interactions;
create the consolidated work-flow for a particular user interaction with the GUI; and
create a short-cut associated with the consolidated work-flow, wherein the short-cut is to be displayed on the GUI, wherein the consolidated work-flow is executed when the short-cut is selected.

12. The MFD of claim 11, further comprising:
a communication interface to communicate with a remotely located server to transmit the consolidated work-flow and the short-cut associated with the consolidated work-flow to a remotely located server.

13. The MFD of claim 11, wherein the user interaction comprises a selection of a job function and a selection of one or more features associated with the job function view selectable options displayed on the GUI.

14. The MFD of claim 11, wherein the interaction threshold comprises a number of selections.

15. The MFD of claim 11, wherein the interaction threshold comprises a complexity weighting score.

16. The MFD of claim 11, wherein the interaction threshold comprises an expected duration threshold for a work-flow on the MFD.

17. The MFD of claim 11, wherein the interaction threshold is associated with a time window.

18. The MFD of claim 17, wherein the short-cut comprises an icon that is displayed on the GUI during the time window associated with the interaction threshold and removed outside of the time window associated with the interaction threshold.

19. The MFD of claim 11, wherein the short-cut and the consolidated work-flow are associated with a user.

20. A method for creating a consolidated work-flow on a multi-function device (MFD), comprising:
monitoring, by a processor, job selections and feature selections by a user on the MFD over a period of time;
determining, by the processor, that an interaction threshold is exceeded by the job selections and feature selections within the period of time;
providing, by the processor, an option to create the consolidated work-flow for the job selections and the feature selections that exceeds the interaction threshold;
creating, by the processor, the consolidated work-flow for the job selections and the feature selections in response to receiving a confirmation to create the consolidated work-flow;
creating, by the processor, an icon associated with the consolidated work-flow;
displaying, by the processor, the icon on a user interface of the MFD;
receiving, by the processor, a selection of the icon; and
executing, by the processor the consolidated work-flow for the job selections and the feature selections, wherein the consolidated work-flow automatically selects the job selections and the feature selections.

* * * * *